(12) United States Patent
Portegys

(10) Patent No.: US 8,717,579 B2
(45) Date of Patent: May 6, 2014

(54) DISTANCE MEASURING DEVICE USING A METHOD OF SPANNING SEPARATELY TARGETED ENDPOINTS

(75) Inventor: Thomas Edward Portegys, Duvall, WA (US)

(73) Assignee: Thomas E. Portegys, Duvall, WA (US)

( * ) Notice: Subject to any disclaimer, the term of this patent is extended or adjusted under 35 U.S.C. 154(b) by 0 days.

(21) Appl. No.: 13/423,278

(22) Filed: Mar. 19, 2012

(65) Prior Publication Data

US 2013/0308120 A1 Nov. 21, 2013

Related U.S. Application Data

(60) Provisional application No. 61/477,511, filed on Apr. 20, 2011.

(51) Int. Cl.
*G01C 3/02* (2006.01)
*G01B 11/14* (2006.01)

(52) U.S. Cl.
USPC .............................. 356/614; 356/21; 356/625

(58) Field of Classification Search
USPC ............ 356/21, 614–625, 601; 382/154, 203; 700/259, 245, 247; 702/94–95, 150, 702/152
See application file for complete search history.

(56) References Cited

U.S. PATENT DOCUMENTS

| 4,498,778 | A | * | 2/1985 | White | 356/606 |
| 4,541,772 | A | * | 9/1985 | Becker | 415/90 |
| 5,978,521 | A | * | 11/1999 | Wallack et al. | 382/294 |
| 7,564,571 | B2 | * | 7/2009 | Karabassi et al. | 356/623 |
| 2008/0306708 | A1 | * | 12/2008 | Germain et al. | 702/153 |
| 2010/0302557 | A1 | * | 12/2010 | Petschko et al. | 356/622 |

* cited by examiner

*Primary Examiner* — Sang Nguyen

(57) ABSTRACT

A portable distance measuring device that works by spanning separately targeted endpoints is described. The device contains a laser distance measuring component and sensing components that track changes in position and orientation of the device, such as accelerometers and gyroscopes. Distance is measured by pointing the laser at an endpoint and measuring the distance to it. Once this measurement is confirmed, the device can be moved to a different vantage location to measure a second endpoint with the laser. The orientation and position of the device for the second distance measurement relative to the first measurement are calculated by the position and orientation sensors. Together these values are sufficient to calculate the distance spanning the endpoints. This calculation is performed by a computer contained in the device and the distance displayed to the user.

7 Claims, 3 Drawing Sheets

BLOCK DIAGRAM

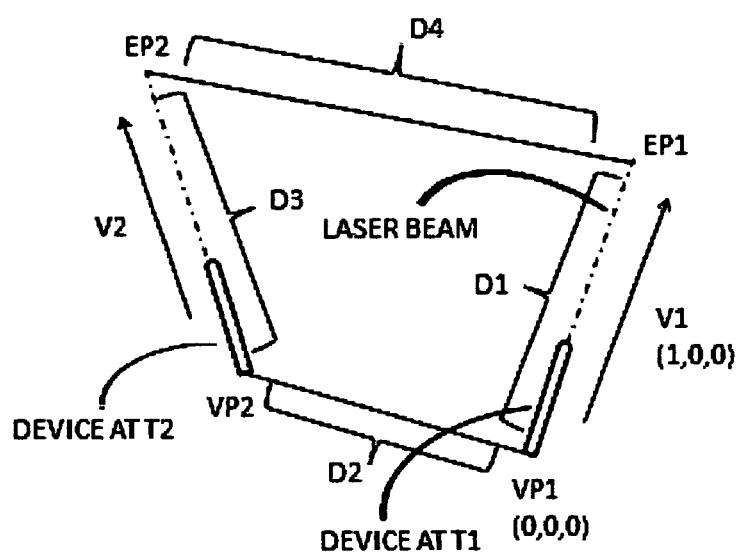
FIG. 1 – OPERATIONAL DIAGRAM

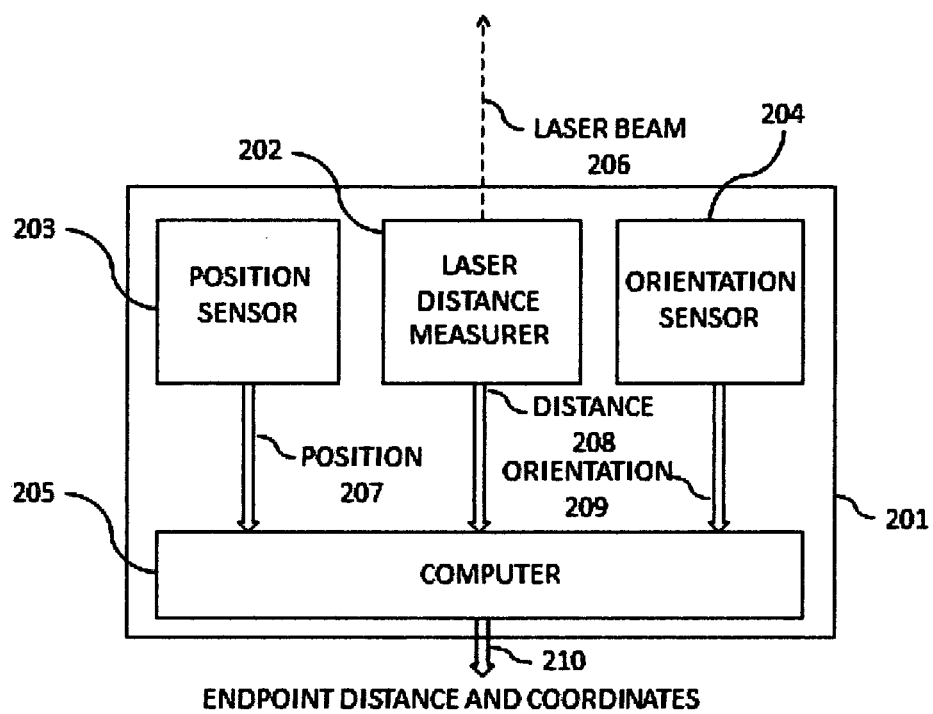
FIG. 2 – BLOCK DIAGRAM

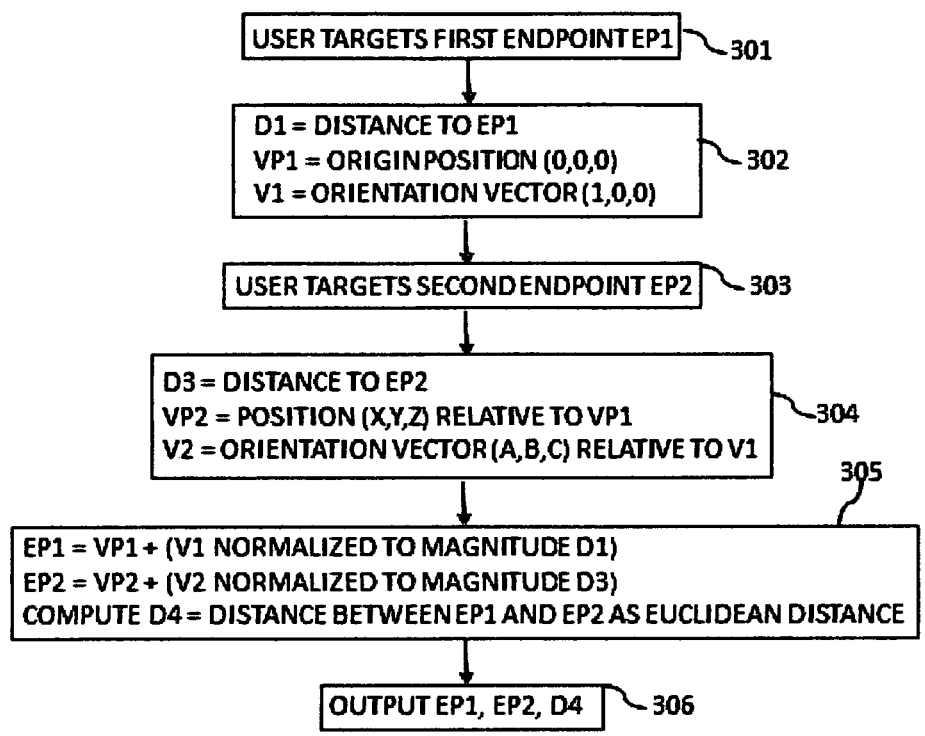
FIG 3 – FUNCTIONAL PROCEDURE

DISTANCE MEASURING DEVICE USING A METHOD OF SPANNING SEPARATELY TARGETED ENDPOINTS

This application claims the benefit of U.S. Provisional Application No. 61/477,511, filed Apr. 20, 2011.

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION (1) Field of the Invention

The invention pertains to the fields of measuring distances with lasers, and position and orientation sensors, such as accelerometers and gyroscopes. It also deals with calculating distances and positions by geometric means. The invention is also related to a technique known as simultaneous localization and mapping (SLAM), which is used by robots and autonomous vehicles to build up a map within an unknown environment.

(2) Utility of the Invention

Distance and size measuring is an essential activity for a multitude of tasks, including planning, estimation, construction, layout, etc. A means of making measurements easier and quicker to perform would be of obvious benefit for these tasks. Currently, this is done either by placing a measuring device such as a tape measure over the span to be measured, or by use of a distance measuring device such as a laser directed at a point to determine the distance from the point to the device. This invention is distinctive in that it allows a user to target two endpoints successively with a laser beam from different vantage points and have the distance and relative coordinates calculated by tracking intervening position and orientation changes of the device.

(3) Feasibility of the Invention

Position and orientation sensors such as accelerometers and gyroscopes have become commonplace and affordable components of other devices. For example, it is common for smart phones to contain accelerometers to assist with orienting the screen depending on a user's handling of the phone, and as inputs to mobile gaming applications. In the realm of tools, accelerometers are used to track angular movements to align a tool to a work piece, for example. The precision of these sensors is improving constantly as the cost drops, making them attractive components for motion-based devices such as the invention described herein.

(4) Description of Related Art Including Information Disclosed Under 37 CFR 1.97 and 1.98. Related Art a) SYSTEM AND METHOD FOR ORIENTATION AND LOCATION CALIBRATION FOR IMAGE SENSORS, Germain et al., Pub. No.: US 2008/0306708 A1, Dec. 11, 2008.

Synopsis:

This is a system employing position measurement sensors and point sources of light to determine the location and orientation of video cameras in a simulation arena environment. The location of a camera is determined by measuring the distance from the camera to at least two known points, where the known points may be point sources of light, other cameras, or a combination thereof.

Comparison with the Current Invention:

In the above invention, known fixed target points are used to determine camera position; there are no laser distance measuring components in the system. In contrast, the current invention relies on a laser distance measuring component to target and measure endpoints arbitrarily located in space.

b) METHOD FOR CALIBRATING A CAMERA-LASER-UNIT IN RESPECT TO A CALIBRATION-OBJECT, Karabassi et al., US007564571B2, U.S. Pat. No. 7,564,571 B2, Jul. 21, 2009.

Synopsis:

The invention refers to a method for calibrating a camera laser-unit with respect to at least one calibration-object disposed at a given position and orientation in a three dimensional space. The method has the advantage that the same calibration-object can be used for the calibration of the camera and of the laser.

Comparison with the Current Invention:

The above invention is about locating the camera laser-unit using a fixed calibration-object as a target. The calibration-object must have a specific shape and markings to allow the camera to compute the location using the image of the calibration-object while the laser targets it. This is not a laser distance measurement as defined in the current invention. Furthermore, the location of the device is not the goal of the current invention; rather the goal is the location and distances spanning arbitrarily located endpoints.

c) MACHINE VISION METHODS USING FEEDBACK TO DETERMINE CALIBRATION LOCATIONS OF MULTIPLE CAMERAS THAT IMAGE A COMMON OBJECT, Wallack et al., U.S. Pat. No. 5,978,521, Nov. 2, 1999.

Synopsis:

The invention provides improved machine vision methods for determining a calibration relationship among the imaging reference frames of multiple cameras that acquire images of a common moveable object. The calibration relationship includes parameters for transforming positional coordinates among the camera's respective imaging reference frames. The method includes placing on the common object a plurality of calibration marks that are at known positions relative to each other with respect to a frame of reference; aligning an axis of the reference frame with an axis of the object's reference frame of motion, i.e., the reference frame in which the object moves; placing a respective mark in the field of view of each camera; determining a calibration relationship among the imaging reference frames of the respective image acquisition devices as a function of the known relative locations of the marks, (ii) the mark positions determined for each camera, and (iii) the object calibrating positions determined for each respective image acquisition device.

Comparison with the Current Invention:

The above invention has fixed cameras viewing a moveable object that is marked with special calibrations that allow the cameras to fix the position of the object in space. In the current invention, neither the device nor the targets are fixed in space. Also, the target endpoints are not marked in any special way. Finally, there is no laser measuring device as defined in the current invention.

d) METHOD FOR DETERMINING POSITION, LASER BEAM DETECTOR AND DETECTOR-REFLECTOR DEVICE FOR A SYSTEM FOR DETERMINING POSITION, Petschko et al., Pub. No.: US 2010/0302557 A1, Dec. 2, 2010.

Synopsis:

The invention relates to a system for determining a position by emitting a laser beam by a laser source positioned in a reference system onto a detector and simultaneously detecting the laser beam by its impingement on a detector that is configured with a plurality of discrete partial detection areas, thus defining an emission direction of the laser.

Comparison with the Current Invention:

The above invention requires the use of a specially configured target component. It also does not use a laser distance measuring device as defined in the current invention.

e) HIGH SPEED SCANNING METHOD AND APPARATUS, Steven J. White, U.S. Pat. No. 4,498,778, Feb. 12, 1985.

Synopsis:

This invention is an apparatus for determining the spatial coordinates of a workpiece on a precisely formed jig using a planar light source and a camera adapted to view the intersection of the planar light with the jig and the workpiece. The form of the jig is detected by the camera and used to compute the coordinates of the workpiece.

Comparison with the Current Invention:

In the above invention, the signal and detection system are at fixed position relative to the target. There is also the special form of the jig to allow video analysis of its image. There also is no second target involved. It also does not use a laser distance measuring device as defined in the current invention.

f) CONTOUR LINE SCANNER, Earl D. Jenks, Publication number U.S. Pat. No. 4,541,722 A, Sep. 17, 1985.

Synopsis:

This invention uses lasers to project contour lines of light upon lumber to allow the most cost-effective cutting of boards. A TV camera detects the contour lines and converts the image into information to control the milling of the lumber.

Comparison with the Current Invention:

Unlike the current invention the above invention uses fixed position devices: the lasers and TV. It also does not use a laser distance measuring device as defined in the current invention.

BRIEF SUMMARY OF THE INVENTION

The invention is a portable distance measuring device that works by spanning separately targeted endpoints. The device contains a laser distance measuring component and sensing components that track changes in position and orientation of the device, such as accelerometers and gyroscopes. Distance is measured by pointing the laser at an endpoint and measuring the distance to it. Once this measurement is confirmed, the device can be moved to a different vantage location to measure a second endpoint with the laser. The orientation and position of the device for the second distance measurement relative to the first measurement are calculated by the position and orientation sensors. Together these values are sufficient to calculate the distance spanning the endpoints. This calculation is performed by a computer contained in the device and the distance displayed to the user. In this way a user can measure distances without placing a device at any of the endpoints or without having the endpoints in view at the same time.

BRIEF DESCRIPTION OF THE SEVERAL VIEWS OF THE DRAWING(S)

FIG. 1 is an operational diagram of the device measuring the distance between two endpoints.

FIG. 2 is a block diagram of the device.

FIG. 3 shows the distance computation algorithm.

DETAILED DESCRIPTION OF THE INVENTION

Referring to the operational diagram FIG. 1, the device at time T1 is shown at vantage point VP1 targeting one endpoint EP1 with a laser distance measurer contained within the device. The distance between VP1 and EP1 is measured as D1 in some suitable unit, such as meters, millimeters, inches, etc. This measurement is confirmed by the user. The 3D coordinates of VP1 are then set to an "origin" in space of (0,0,0). The position change sensor contained within the device subsequently tracks and measures changes to the device's position relative to the origin. The vector from VP1 to EP1 is also set to a base value of (1,0,0). The orientation change sensor within the device then tracks and measures changes in orientation relative to this base value and outputs a vector reflecting this. In this coordinate system, the coordinates of EP1 are (D1,0,0).

At time T2, the device has been moved a distance D2 to vantage point VP2 and the laser beam targeted on the second endpoint, EP2. The distance from VP2 to EP2 measured as D3. Once confirmed, the relative coordinates of VP2 are produced by the position change sensor, and the relative value of the vector V2 from VP2 to EP2 is produced by the orientation change sensor. Normalizing vector V2 to the scalar distance D3 and adding it to point VP2 yields the coordinates of EP2. The Euclidean distance D4 between EP1 and EP2 is then determined by the Pythagorean Theorem.

FIG. 2 is a block diagram of the device that embodies the operational functionality described by FIG. 1. The device 201 is shown with its major components: a laser distance measuring component 202, a position sensor 203, an orientation sensor 204, and a computer 205. The laser distance measuring component is shown with a laser beam 206 emitted toward a target endpoint. The position 207, distance 208, and orientation 209 measurements are shown as inputs to the computer 205, which computes the distance and endpoint coordinates 210 as previously described and outputs these values.

FIG. 3 is a description of the functional procedure that produces the outputs from the inputs. The procedure refers to the variables shown in the operational diagram FIG. 1.

The first step 301 occurs when the user targets and confirms the first endpoint EP1. Step 302 then sets the distance D1 to the distance measured from the device to EP1, sets the point VP1 to the 3D origin (0,0,0) and sets the vector V1 to the initial value of (1,0,0).

The next step 303 occurs when the user targets and confirms the second endpoint EP2. Step 304 subsequently sets D3 to the distance measured from the device to EP2, the point VP2 to the position relative to the origin produced by the position sensor, and the vector V2 to the orientation vector relative to the vector V1 produced by the orientation sensor.

Once the above steps are taken, step 305 computes the coordinates of EP1 by adding the origin point VP1 to the vector V1 normalized by the distance D1. EP2 is likewise computed from VP2, V2 and D3. The distance D4 between EP1 and EP2 is then calculated as the Euclidean distance spanning EP1 and EP2.

Finally step 306 outputs the distance D4 and the endpoint coordinates EP1 and EP2.

I claim:

1. A method for measuring a linear distance between two endpoints located in space by a device, the method comprising the steps of:
    (a) measuring sequentially the distance from the device to the endpoints by a laser distance measuring component, wherein the two measurements are taken from different vantage points;
    (b) measuring and tracking the relative a position and orientation of the device by a position and orientation sensor components in the device during the interval between the distance measurements; and
    (c) combining together the measured distance, the position and the orientation to a computer component, wherein the computer for calculating the distance spanning the endpoints and the relative coordinates of the endpoints, and wherein the computer for calculating the accuracy of the distance and coordinates as a function of the input measurements and the precision of the components.

2. The method of claim 1, a user of the device selecting the first of the two endpoints by pointing the laser beam at the endpoint and confirming the endpoint by operating a control that captures a distance measurement to the endpoint, wherein the user moving to a vantage point where the second endpoint is visible, wherein the user selecting, confirming and measuring the second endpoint in the same manner as for the first endpoint, wherein the completion of the distance measurement capture for the second endpoint subsequently causes the device to perform the computation step of method (c), wherein the device allowing the user to clear a measurement operation, and wherein clearing erases previously captured endpoints, zeros out the position and orientation states, and preparing for the reception of new endpoint captures.

3. The method of claim 1, the endpoint distances, coordinates, and measurement accuracy are visible to the device user on a view screen contained in the device.

4. The method of claim 1, the device allows a user to store endpoint measurements and coordinates as retrievable designations in a memory computer of the device, as well as allowing a user to discard stored measurements.

5. The method of claim 1, the device itself used as a component of another system for entailing an interface to operate the device by an external computer, wherein the device for producing the distances, endpoint coordinates, and accuracy measurements in a form suitable for transmission and further machine processing.

6. The method of claim 1, the device is optionally equipped with a camera to record captured endpoint images which are stored in association with the endpoint measurements and coordinates.

7. The method of claim 1, the device is contained in a portable self-powered unit suitable to be carried by hand and manually operated.

* * * * *